(12) United States Patent
Onagawa

(10) Patent No.: US 6,804,259 B1
(45) Date of Patent: Oct. 12, 2004

(54) DIGITAL BROADCAST RECEIVER

(75) Inventor: Seiki Onagawa, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/558,167

(22) Filed: Apr. 26, 2000

(30) Foreign Application Priority Data

Apr. 27, 1999 (JP) .......................................... 11/119508

(51) Int. Cl.$^7$ .............................. H04J 3/00; H04J 1/00; H04J 3/04; H04H 1/04; H04N 7/16
(52) U.S. Cl. ...................... 370/476; 370/535; 370/487; 725/139
(58) Field of Search ................................ 370/464, 465, 370/345, 476, 535, 537, 538, 539, 486, 487; 348/423.1, 500; 375/240.28; 725/131, 139, 151, 68

(56) References Cited

U.S. PATENT DOCUMENTS

| 5,898,695 | A | 4/1999 | Fujii et al. ................... 370/464 |
| 5,966,385 | A | 10/1999 | Fujii et al. ................... 370/465 |
| 6,233,255 | B1 | 5/2001 | Kato et al. ................... 370/486 |
| 6,353,613 | B1 | 3/2002 | Kubota et al. ............... 370/389 |
| 6,421,359 | B1 * | 7/2002 | Bennett et al. ............. 370/538 |
| 2001/0009556 | A1 * | 7/2001 | Kato et al. ................... 370/486 |
| 2001/0015986 | A1 * | 8/2001 | Sugimoto et al. ........... 370/487 |

FOREIGN PATENT DOCUMENTS

| JP | 8-275147 | 10/1996 |
| JP | 10-23070 A | 1/1998 |
| JP | 10-41909 A | 2/1998 |
| JP | 10-66046 A | 3/1998 |
| JP | 10-70710 A | 3/1998 |

* cited by examiner

*Primary Examiner*—Frank Duong
*Assistant Examiner*—Kevin C. Harper
(74) *Attorney, Agent, or Firm*—Foley & Lardner LLP

(57) ABSTRACT

A digital broadcast receiver capable of simultaneously inputting packet data of a plurality of channels which may have the same ID is disclosed. A converter converts the PID of stream data inputted from a demodulator into unique PID. The stream data converted by the converter and stream data inputted from another demodulator are multiplexed to a single stream of data. The single stream of data is divided into to-be-decoded packets, first packets having converted PIDs, and second packets inputted from the other demodulator. The converted PID of a first packet is converted to the original PID. The first packets and second packets outputted by the stream divider are separately stored in a memory.

20 Claims, 8 Drawing Sheets

FIG. 4

PID TABLE MAP
16BIT

| PID NO. 00 | 0000h |
|---|---|
| PID NO. 01 | 0002h |
| PID NO. 02 | 0004h |
| PID NO. 03 | 0006h |
| ⋮ | ⋮ |
| PID NO. 30 | 003Ch |
| PID NO. 31 | 003Eh |

} PID TABLE FOR FILTER

| Sou PID NO. 00 | 0040h |
|---|---|
| Sou PID NO. 01 | 0042h |
| Sou PID NO. 02 | 0044h |
| Sou PID NO. 03 | 0046h |
| ⋮ | ⋮ |
| Sou PID NO. 30 | 007Ch |
| Sou PID NO. 31 | 007Eh |

} PID TABLE A FOR CONVERSION

| Des PID NO. 00 | 0080h |
|---|---|
| Des PID NO. 01 | 0082h |
| Des PID NO. 02 | 0084h |
| Des PID NO. 03 | 0086h |
| ⋮ | ⋮ |
| Des PID NO. 30 | 00BCh |
| Des PID NO. 31 | 00BEh |

} PID TABLE B FOR CONVERSION

PORTION IN WHICH CODE DATA OUT OF ERROR CORRECTION
WERE INSERTED (16 BYTES)

DIGITAL BROADCAST RECEIVER

BACKGROUND OF THE INVENTION

1. Field of the Invention

The present invention relates to a digital broadcast receiving apparatus for receiving stream data of a plurality of channels in a digital broadcast system such as digital satellite broadcast system or cable television system.

2. Description of the Related Art

When handling video data and audio data in digital satellite broadcast system cable TV system and the like, compression coding is widely used to compress the amount of information by reducing information redundancy of an enormous amount of data. As this compression coding method, for example, MPEG2 (Moving Picture Experts Group-2) standards defined in ISO/IEC 13818 and so on have been well known.

In the MPEG2 standards, not only the compression coding method of video data and audio data, but also the multiplexing method of coded data is standardized in "ISO/IEC 13818-1: 1994 Information technology Coding of moving pictures and associated audio Part 1: Systems" (MPEG2 system).

By using this multiplexing technique, video data and audio data compressed in amount of information by using the compression coding method are subjected to time division multiplexing. As a result, it is possible to Multiplex a plurality of sets (programs) of video data and audio data associated therewith in one carrier (one channel) and transmit the multiplexed data (program multiplexing).

In such an MPEG2 system, a program stream (PS) system and a transport stream (TS) system are defined as a technique for packet multiplexing.

In each of these systems, video data or audio data subjected to compression coding are packetized into PS (Program Stream) packets or TS (Transport Stream) packets, and these packets are then multiplexed. Typically, in a broadcasting system, a TS system capable of multi-program has been used.

There has been disclosed a device for receiving video data, audio data, and added value service data from a bit stream formed of a plurality of programs in Japanese Patent Application Unexamined Publication No. 8-275147. More specifically, this conventional receiving device is provided with data selection means for selecting a coded stream, multiplexed data, and added value information corresponding to one channel from a multiplexed data stream, and demultiplexes desired TS packets to extract video data, audio data, and added data.

Packet-multiplexed data are inputted in a bit stream form, from a transmission medium of digital satellite broadcasting or cable TV system. This bit stream has been obtained by adding error correction codes to TS packets of the MPEG2 standards and applying transmission path modulation to resultant TS packets. The inputted bit stream is demodulated and subjected to error correction processing, and supplied as TS system data to a packet demultiplexer. In order to obtain desired video and/or audio data from program-multiplexed TS packets, the packet demultiplexer separates and extracts desired TS packets and sends them to a subsequent stage.

The format of a TS packet will be described briefly by referring to FIGS. 9A, 9B and 9C, before describing a conventional digital broadcast receiver.

In FIG. 9A, each TS packet has a fixed length of 188 bytes. TS packets and 16-byte error correction codes are arranged alternately. Each TS packet is basically formed of a 4-byte transport stream header (TS header) and a payload including data to be transmitted. As necessary, an extension header called adaptation field is inserted between the TS header and the payload. Within the TS header, a packet ID (PID) which is an identifier indicating the attribute of the TS packet is represented by 13 bits. Data included In the payload is classified into two types as shown in FIG. 9B and FIG. 9C, according to information to be transmitted.

FIG. 9B shows the case where a part of a PES (Packetized Elementary Stream) packet is included in a payload. This PES packet includes a PES header and coded video data or coded audio data, which is an element of contents of a program to be transmitted. The PES header includes the kind of an element included within the PES packet and a PES packet length. This PES packet is divided into payloads of TS packets provided with different PIDs according to kinds of elements included within the PES packet. Resultant payloads are carried by TS packets.

FIG. 9C shows the case where a payload includes program specific information (PSI) which is specific information for system control and service information (SI) which is information specific to service such as program information. Hereafter, the information PSI and the information SI are referred to collectively as "PSI/SI data."

The PSI/SI data is tabulated every unit called "section." In the same way as the case of PES, the PSI/SI data is divided into payloads of TS packets respectively provided with different PIDs, according to included information contents and resultant payloads are stored in TS packets. Besides the PSI/SI data which is the contents of the section, each section includes a section header at its head. In the section header, a table ID representing the table kind of the section and a section length indicating the section length are described At the end of the section, cyclic redundancy check (CRC) bits are included.

The PSI data has the structure of a hierarchical table. For each program (set of video and audio data), the PSI data includes a program map table (PMT) describing correspondence between elements with PIDs (packet IDs) and a program association table (PAT) describing corresponding between the PMTs with PIDS.

Further, in the case where transmitted TS packets are encrypted (scrambled), key information for solving the encrypted data is needed. In such a case, however, the PSI includes an entitlement control message (ECM) representing descramble information of each program and an entitlement management message (EMM) representing key information of each contracting subscriber.

Further, in the case where a plurality of scramble systems, relations between ECMs and EMMs corresponding to these scramble systems are described by using a conditional access table (CAT).

In this way, each TS packet has a payload including an element as shown in FIG. 9B or a payload including information (system control data) for system control as shown in FIG. 9C. These can be distinguished by the PID. In a TS packet having system control data, the contents of each section can be distinguished by the section header.

FIG. 1 shows an example of a conventional digital broadcast receiving apparatus comprised of a demodulator 101, a packet demultiplexer 102, a CPU 103, a ROM 140, and a RAM 105. In the packet demultiplexer 102, the PID of a TS packet storing a desired program is stored in a PID table 112. Upon receiving program-multiplexed TS packets from the demodulator 101, a PID filter 111 compares the PID of a TS packet received from the demodulator 101 with the PIDs stored in the PID table 112 and extracts a TS packet matching one of the PIDs of the PID table 112. A plurality of necessary PIDs are previously written by the CPU 103 into the PID table 112 via a data bus and a bus I/F 114.

The ROM 104 stores a system control program for controlling the operations of the digital broadcast receiving apparatus by running on the CPU 103. The CPU 103 operates in accordance with the system control program.

Among TS packets extracted by the PID filter 111, TS packets including elementary data such as video data or audio data are successively supplied to a decoder I/F 113, subjected to removal (demultiplexing) of TS header and adaptation field, and are then sent to the outside through an elementary output port.

ATS packet Including PSI/SI data in Its payload, which has been extracted by the PID filter 111, is once stored in a packet storage area of the RAM 105 via the bus I/F 114 and subjected to section reconfiguration in the CPU 103. Out of the reconfigured section, only information required for system control is processed by the CPU 103, and the reconfigured section is stored back into a different storage .area of the RAM 105 and is then analyzed by the CPU 103 and thereby information required for system control is extracted.

Further, as the configuration of a multiplexed-packet demultiplexer, there is known a configuration having descrambling means for the case where data obtained by conducting scramble processing on information to be transmitted is received.

FIG. 2 shows another example of the conventional apparatus. In FIG. 2, reference numeral 106 denotes a descrambler. The same components as those shown in FIG. 1 are denoted by the same reference numerals, and the descriptions of the same components will be omitted.

In the case where scramble processing has been conducted on information to be transmitted, a received TS packet subjected to processing of demodulation and error correction in the demodulator 101 has been scrambled.

The CPU 103 can know information corresponding to the scramble system by receiving a CAT In the transmitted TS system in the same way as that shown in FIG. 1.

On the basis of the CAT, ECM, and EMM, the CPU 103 analyzes the Information key required for descrambling to obtain a scramble releasing key, and sets the PID of a program corresponding to the scramble releasing key in the descrambler 106 via the bus. Even if information to be transmitted has been subjected to scramble processing, therefore, it is possible to receive data while releasing the scramble.

However, the above-described conventional apparatus has such a configuration as to take in received stream data as it is. For inputting packet data included in stream data of a plurality of channels which can have IDs having the same value, therefore, the conventional apparatus needs to have as many combinations of encryption release means, data packet extraction means, ID storage means operating on the basis of ID of each data packet as the number of input channels. As a result, the conventional apparatus has a problem that its circuit becomes large in scale.

SUMMARY OF THE INVENTION

The present invention has been made in view of the above-described problems.

An object of the present Invention is to provide a digital broadcast receiving apparatus capable of simultaneously inputting packet data included in stream data of a plurality of channels which can have the same ID.

According to the present invention, a digital broadcast receiver for inputting stream data of a plurality of channels from a plurality of demodulators, includes: a converter for converting packet identification information of stream data inputted from a demodulator; a multiplexer for multiplexing stream data converted by the converter and stream data inputted from another demodulator to a single stream of data; a stream divider for dividing the single stream of data into necessary packets, first packets having packet identification information converted by the converter, and second packets inputted from the other demodulator; a reverse converter for converting the converted packet identification information of a first packet to original packet identification information; and a transfer means for transferring packets outputted by the reverse converter and second packets outputted by the stream divider to separately storing them in a memory.

According to an aspect of the present invention, a digital broadcast receiver includes: a demodulator for demodulating a modulated signal to produce first stream data including a plurality of packets on each of the channels, wherein each of the packets is one of an element signal packet and a control signal packet; a conversion table for storing conversion information for predetermined packet identification information; a converter for converting packet identification information of a packet in first stream data on a predetermined channel to temporary identification information to produce second stream data when the packet identification information of the packet matches the predetermined packet identification information stored in the conversion table; a multiplexer for multiplexing the first stream data and the second stream data to third stream data; a packet distributor for distributing each of control signal packets included in the third stream data depending on which of the first and second stream data the packet is included in: a reverse converter for converting the temporary identification information of a control signal packet distributed by the packet distributor and included in the second stream data to original packet identification information; and a memory for separately storing control signal packets included in the first stream data and control signal packets which has been converted by the reverse converter.

The conversion table may include a first table containing the predetermined packet identification information identifying a plurality of packets on a plurality of channels; and a second table containing the temporary identification information with which the predetermined packet identification information is replaced, the temporary identification information uniquely identifying a single packet.

The conversion table may include: a filter table containing predetermined filter packet identification information identifying an element signal packet: a first table containing the predetermined packet identification information identifying a plurality of packets on a plurality of channels; and a second table containing the temporary identification information with which the predetermined packet identification information is replaced, the temporary identification information uniquely identifying a single packet.

The multiplexer multiplexes the first stream data and tho second stream data to the third stream data and produces a data select signal indicating which of the first and second stream data is selected in the third stream data. The packet distributor distributes each of packets included in the third stream data to a decoder depending on whether the packet is the element signal packet, by referring to the filter table of the conversion table and then distributes each of remaining packets in the third stream data to a first output and a second output, depending on the data select signal received from the multiplexer.

According to another aspect of the present invention, a digital broadcast receiver Includes: a demodulator for demodulating a modulated signal to produce first stream data including a plurality of packets on each of the channels, wherein each of the packets is one of an element signal packet and a control signal packet; a conversion table for storing conversion information for predetermined packet identification information; a converter for converting packet identification information of a packet in first stream data on a predetermined channel to temporary identification information to produce second stream data when the packet identification information of the packet matches the predetermined packet identification information stored in the conversion table; a multiplexer for multiplexing the first stream data and the second stream data to third stream data; a descrambler for descrambling the third stream data according to a preset descrambling key; a packet distributor for distributing each of control signal packets included in the descrambled third stream data depending on which of the first and second stream data the packet is included in; a reverse converter for converting the temporary identification information of a control signal packet distributed by the packet distributor and included in the second stream data to original packet identification information; and a memory for separately storing control signal packets included in the first stream data and control signal packets which has been converted by the reverse converter.

According to the present invention, packets having the same packet ID on different channels are each provided with unique packet IDs over the different channels. Therefore, a plurality of channels can be handled as a single stream of data multiplexed by the multiplexer, resulting in reduced circuit amount and lower cost.

BRIEF DESCRIPTION OF THE DRAWINGS

FIG. 4 is a diagram showing an example of the configuration of a PID table in the embodiment of the present invention;

DESCRIPTION OF THE PREFERRED EMBODIMENT

An embodiment of the present invention will now be described by referring to drawings.

Figure 1:
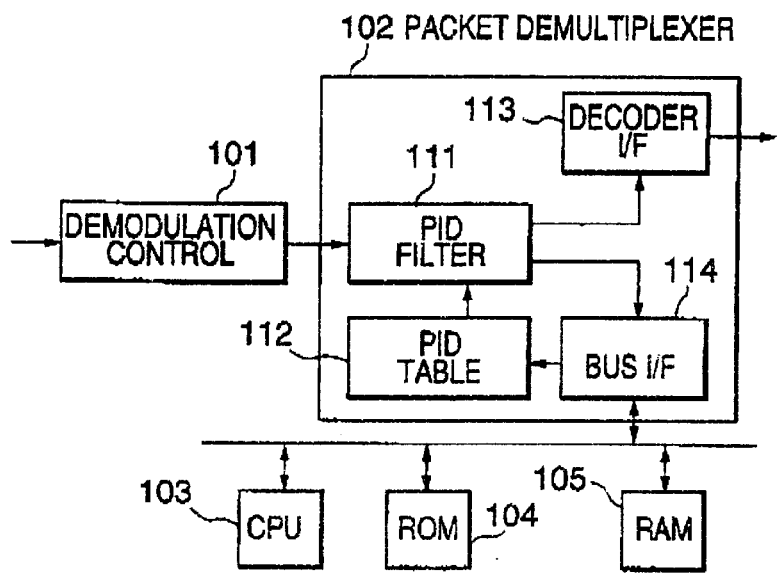
FIG. 1 is a diagram showing an example of the configuration of a conventional packet demultiplexing apparatus.
Figure 2:
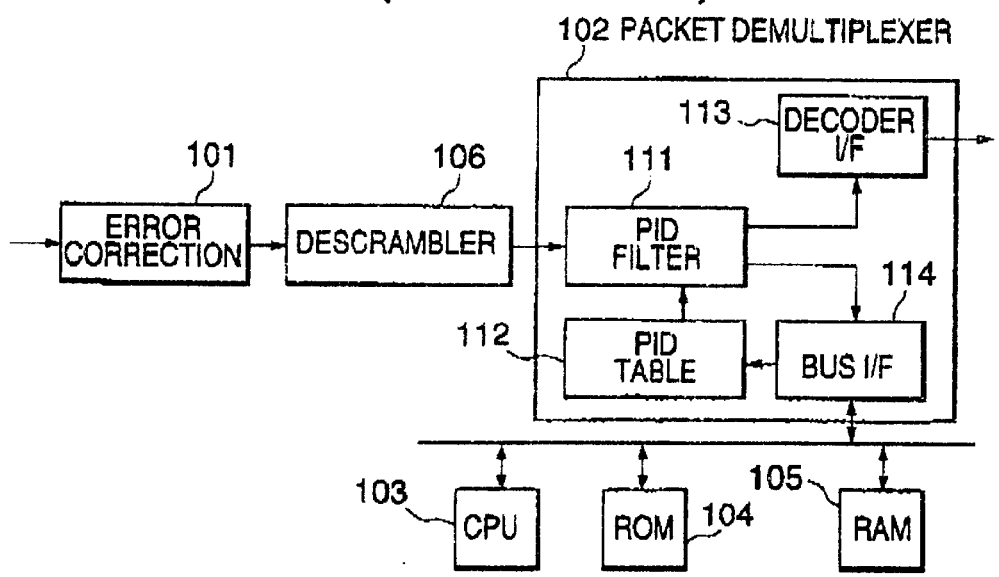
FIG. 2 is a diagram showing another example of the configuration of a conventional packet demultiplexing apparatus.
Figure 3:
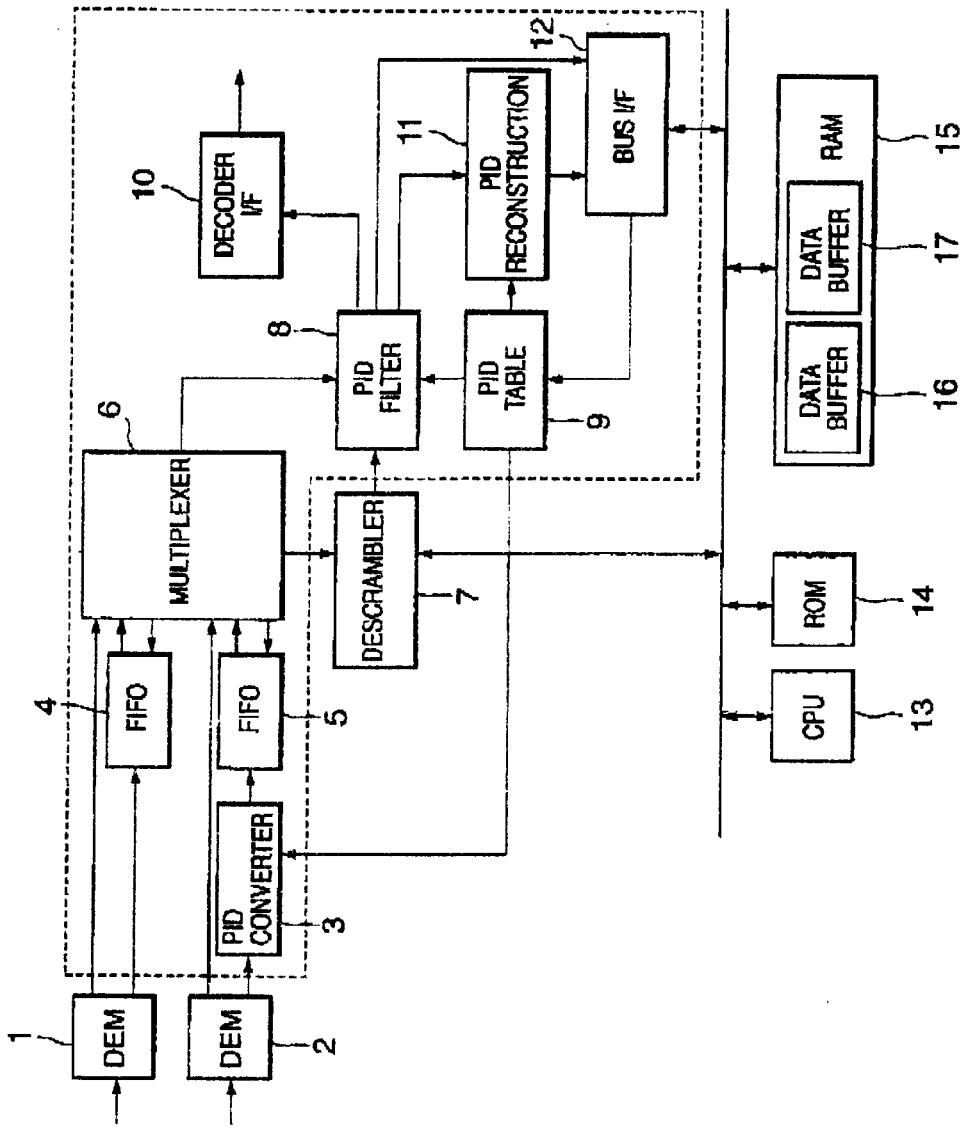
FIG. 3 is a block diagram showing the configuration of an embodiment of the present invention.

Referring to FIG. 3, a digital broadcast receiving apparatus 18 includes a first FIFO (First In First Out) buffer 4 for temporarily storing stream data demodulated by a first demodulator 1 and conducting frequency conversion between write clock and read clock. The digital broadcast receiving apparatus 18 further includes a PID converter 3 for receiving stream data demodulated by a second demodulator 2 and converting the packet identification (PID) to an appreciate value. The digital broadcast receiving apparatus 18 further includes a second FIFO buffer 5 for temporarily storing data subjected to PID conversion and conducting frequency conversion between write clock and read clock. The digital broadcast Receiving apparatus 18 further includes a multiplexer 6 for receiving and multiplexing data inputted from the first and second demodulators 1 and 2, the first FIFO buffer 4, and the second FIFO buffer 5. The digital broadcast receiving apparatus 18 further includes a descrambler 7, a PID filter 8, a PID table 9, a PID reconstruction section 11, a decoder interface 10, and a bus interface 12. The digital broadcast receiving apparatus 18 Is connected to a bus which connects a CPU 13, a ROM 14, and a RAM 15 having data buffers 16 and 17 therein. Synchronization signals including clock pulses are supplied from the first and second demodulators 1 and 2 directly to the multiplexer 6.

The stream data supplied from the first demodulator 1 is written to the first FIFO buffer 4 according to a write clock. The stream data supplied from the second demodulator 2 is subjected to replacement of packet PIDs with arbitrary values in the PID converter 3 before written to the second FIFO buffer 5 according to the write clock. By reading out data from the first FIFO buffer 4 and the second FIFO buffer 5 at a rate equivalent to twice the write clock rate, the multiplexer 6 multiplexes data into one stream.

Further, the multiplexer 6 outputs a data select signal to the PID filter 8. The data select signal indicates whether each packet of data included in the multiplexed stream data is a packet inputted from the demodulator 1 or a packet inputted from the demodulator 2. The multiplexer 6 supplies a first FIFO write enable (WE) signal and a first FIFO read enable (RE) signal to the first FIFO buffer 4. The multiplexer 6 supplies a second FIFO write enable (WE) signal and a second FIFO read enable (RE) signal to the second FIFO buffer 5.

The first FIFO buffer 4 and the second FIFO buffer 5 starts writing stream data in response to the FIFO write enable signal supplied from the multiplexer 6. Only when the FIFO read enable signal is active, the first FIFO buffer 4 and the second FIFO buffer 5 are allowed to output stored stream data.

The first demodulator 1 and the second demodulator 2 conducts processing of demodulation and error correction on modulated stream data supplied from cable TV or satellite broadcast system. The first demodulator 1 and the second demodulator 2 thus supplies demodulated and error-corrected stream data to the first FIFO buffer 4 and the PID converter 3, respectively.

The PID table 9 stores PID information of a packet containing a program to be decoded, PID information of a packet to be extracted from stream data, PID information for converting packets included In stream data supplied from the second demodulator 2, and PID information provided by the conversion. The PID information of packets containing the program to be decoded and the PID information of packets to be extracted from the stream date are supplied to the PID filter 8. The PID information for converting packets included in the stream data supplied from the second demodulator 2, and the PID information provided by the conversion are supplied to the PID converter 3 and the PID reconstruction section 11.

On the basis of desired PID information for conducting PID conversion stored in the PID cable 9 and the PID information replaced with by the PID conversion, the PID converter 3 converts PIDs of packets included in the stream data supplied from the second demodulator 2 and outputs the PID-converted packets to the second FIFO buffer 5.

Using PID information and the scramble release key set by the CPU 13, the descrambler 7 conducts descramble processing on multiplexed stream data multiplexed as one stream by the multiplexer 6. The descrambler 7 outputs the multiplexed stream data subjected to descramble processing to the PID filter 8.

The PID filter 8 monitors the PID of each of packets Included in the multiplexed stream data. If a packet has a PID of a program to be decoded, then the PID filter 8 outputs the packet data to the decoder I/F 10.

In the case of packet data having a PID matching a PID of a packet to be extracted, the PID filter 8, depending on the data select signal received from the multiplexer 6, outputs the packet data inputted from the first demodulator 1 to the bus I/F 12 and outputs the packet data inputted from the second demodulator 2 to the PID reconstruction section 11.

Contrary to the PID converter 3, the PID reconstruction section 11 replaces the converted PID by the PID converter 3 with the original PID on the basis of information stored in the PID table 9, and outputs resultant data to the bus I/F 12.

The bus I/F 12 acts as an intermediary when the CPU 13 sets PID information in the PID table 9 and controls the timing of writing stream data into the RAM 15. The CPU 13 runs the system control program stored in the ROM 11 to control the descrambler 7 and the bus I/F 12.

Pid Table

FIG. 4 shows an example of the detailed contents of the PID table 9 in the embodiment of the present invention.

With reference to FIG. 4, the PID table 9 stores a filter PID table containing PIDs of packets to be extracted at memory locations addressed from 0000h (where h is a hexadecimal representation) to 003Eh. A conversion PID table A containing source PIDs of packets to be PID-converted by the PID converter 3 is stored at memory locations addressed from 0040h to 007Eh of the PID table 9. A conversion PID table B containing destination PIDS to be replaced with after the PID conversion by the PID converter 3 is stored at memory locations addressed from 0080h to 00BEh.

In the filter PID table, for example, the locations of 0000h and 0002h can be used as a table for storing PID information of packets storing a program to be decoded.

Pid Conversion

Figure 5:
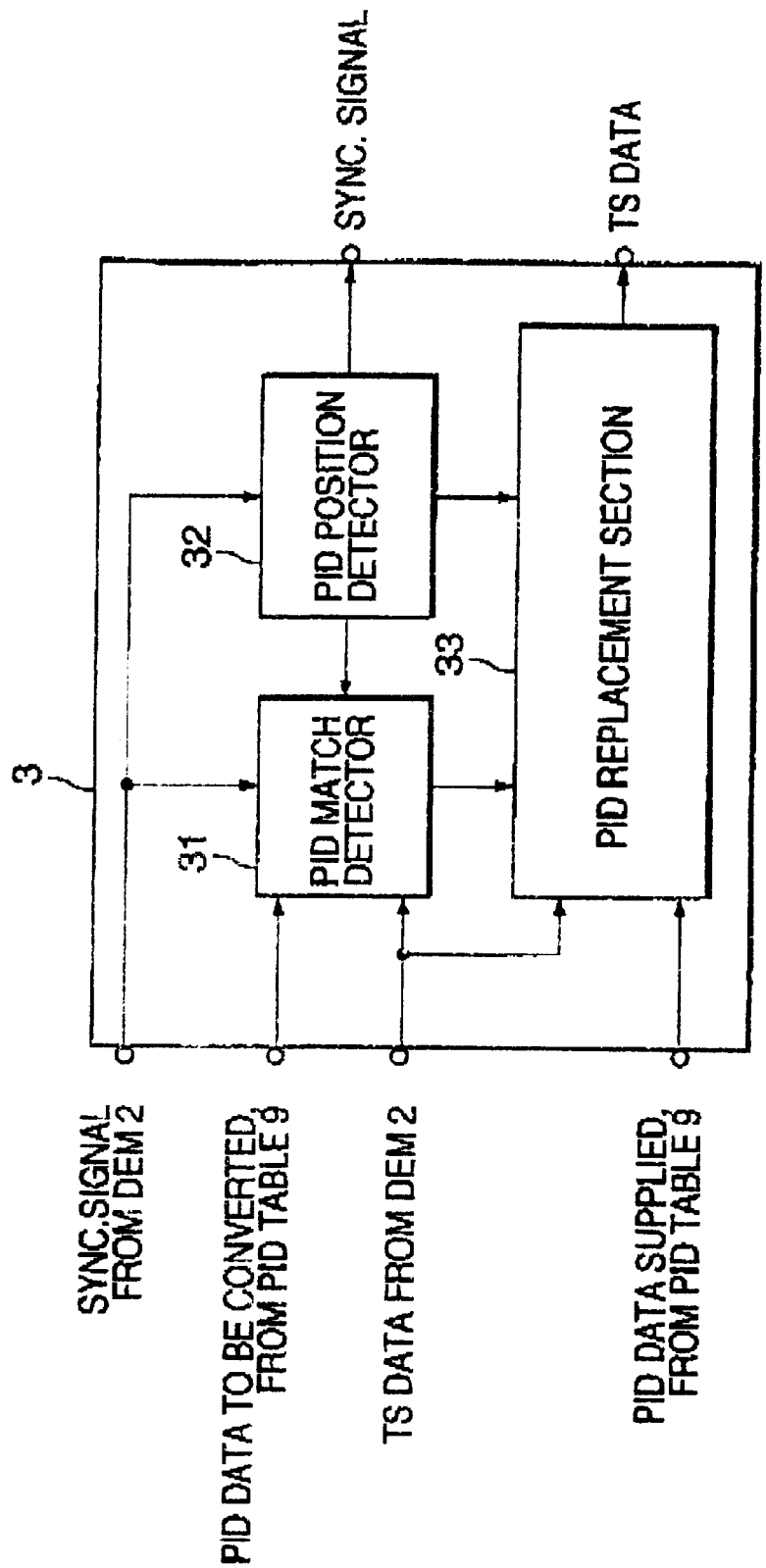
FIG. 5 is a diagram showing an example of a PID converter and a PID reconstruction section.

FIG. 5 shows a detailed configuration of the PID converter 3 or the PID reconstruction section 11 in the embodiment of the present invention. The PID converter 3 and the PID reconstruction section 11 have the same configuration. Hereafter, the PID converter 3 will be described.

Referring to FIG. 5, the PID converter 3 includes a PID match detector 31, a PID position detector 32, and a PID replacement section 33.

On the basis of a synchronization signal received from the second demodulator 2, the PID position detector 32 detects the position of a PID in a packet included in inputted stream data, and outputs a PID position signal indicating a detection result to the PID match detector 31 and the PID replacement section 33.

When the PID position signal has been received from the PID position detector 32 and the current data of a stream data is PID data, The PID match detector 31 compares a PID in the stream data with a PID value of the conversion PID table A stored in the PID table 9. When a match is found, the PID match detector 31 outputs a conversion PID match signal indicating the PID match to the PID replacement section 33.

The PID replacement section 33 receives the PID position signal from the PID position detector 32 and the conversion PID match signal from the PID match detector 31. If the PID match signal indicates the PID match, then the PID replacement section 33 replaces the PID with the corresponding value of the conversion PID table B stored in the PID table 9 and outputs a resultant data stream to the second FIFO buffer 5.

Unless the PID position signal indicates that the current stream data is PID data and the conversion PID match signal indicates the PID match, the PID replacement section outputs the input stream data as it is.

The PID reconstruction section 11 has the same circuit configuration as the PID converter 3, provided that the values of the conversion PID table B stored in the PI table 9 are input to the PID match detector 31 as the PID information and the values of the conversion PID table A are input to the PID replacement section 33.

Muliplexer

Figure 6:
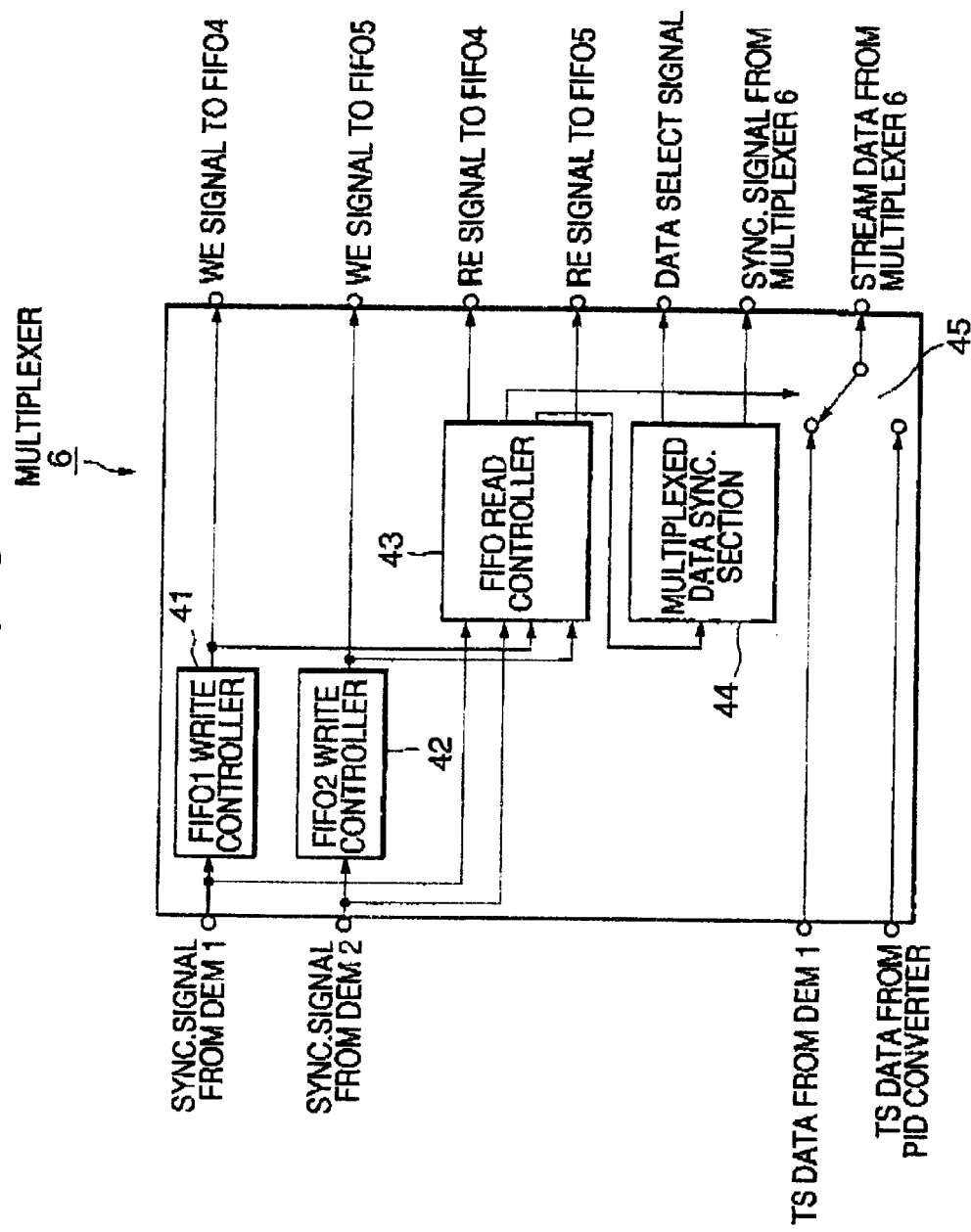
FIG. 6 is a diagram showing an example of the configuration of a multiplexer in then embodiment of the present invention.

FIG. 6 shows a detailed configuration of the multiplexer 6 in the embodiment of the present invention.

With reference to FIG. 6, the multiplexer 6 includes a first FIFO write controller 41, a second FIFO write controller 42, a FIFO read controller 43, a multiplexed-data synchronizing section 44, and a switch 45.

The first FIFO write controller 41 and the second FIFO write controller 42 receive synchronization signals from the demodulator 1 and the PID converter 3 (that is, demodulator 2), respectively. Upon detecting a synchronization signal Indicating the head of a packet, the first FIFO write controller 41 and the second FIFO trite controller 42 output a first FIFO write enable signal and a second write enable signal to the first FIFO buffer 4 and the second FIFO buffer 5 respectively. The first FIFO write enable signal and the second write enable signal are also output to the FIFO read controller 43.

If the FIFO read controller 43 detects such a state that a first synchronization signal supplied from the first demodulator 1 indicates the head of a packet when the first FIFO write enable signal is active or such a state that a second synchronization signal supplied from the PID converter 3 indicates the head of a packet when the second FIFO write enable signal is active, then the FIFO read controller 43 makes a FIFO read enable signal active for a selected one of the FIFO buffers 4 and 5 depending on which of the first and second synchronization signals is detected earlier. When the FIFO read enable signal has been made active, the FIFO read controller 43 outputs a read start signal indicating that the reading from the first FIFO buffer 4 and the second FIFO buffer 5 has been started, to the multiplexed-data synchronizing section 44.

When the read start signal has become active, the multiplexed-data synchronizing section 44 counts the number of data units read from the first FIFO buffer 4 and the second FIFO buffer 5. The count of read data units is reset every packet (for example, 188 bytes of a TS packet plus 16 bytes of empty data in which code data out of error correction were placed).

Further, on the basis of the count value of read data units, the multiplexed-data synchronizing section 44 outputs to the descrambler 7 a multiplexed-data synchronization signal, which becomes active only when the count value indicates the head of a packet.

In the case where the first FIFO read enable signal is active, the FIFO read controller 43 makes the first FIFO read enable signal inactive and makes the second FIFO read enable signal active, at the reset timing of counting of data read by the multiplexed data synchronizing section. In the case where the second FIFO read enable signal is active, the FIFO read controller 43 makes the second FIFO read enable signal inactive and makes the first FIFO read enable signal active, at the reset timing of counting of data read by the multiplexed-data synchronizing section. This operation is continued.

The first FIFO read enable signal and the second FIFO read enable signal are supplied to the multiplexed-data synchronizing section 44 and the switch 45 as well. If the first FIFO read enable signal is active, then the switch 45 selects input data from the first FIFO buffer 4. If the second FIFO read enable signal is active, then the switch 45 selects input data from the second FIFO buffer 5.

On the basis of the first FIFO read enable signal and the second FIFO read enable signal taking into account a delay caused by the descrambler 7, the multiplexed-data synchronizing section 44 generates the data select signal indicating whether a packet in a data stream output from the descrambler 7 is inputted from the demodulator 1 or the demodulator 2 and outputs the data select signal to the PID filter 8.

Pid Filter

Figure 7:
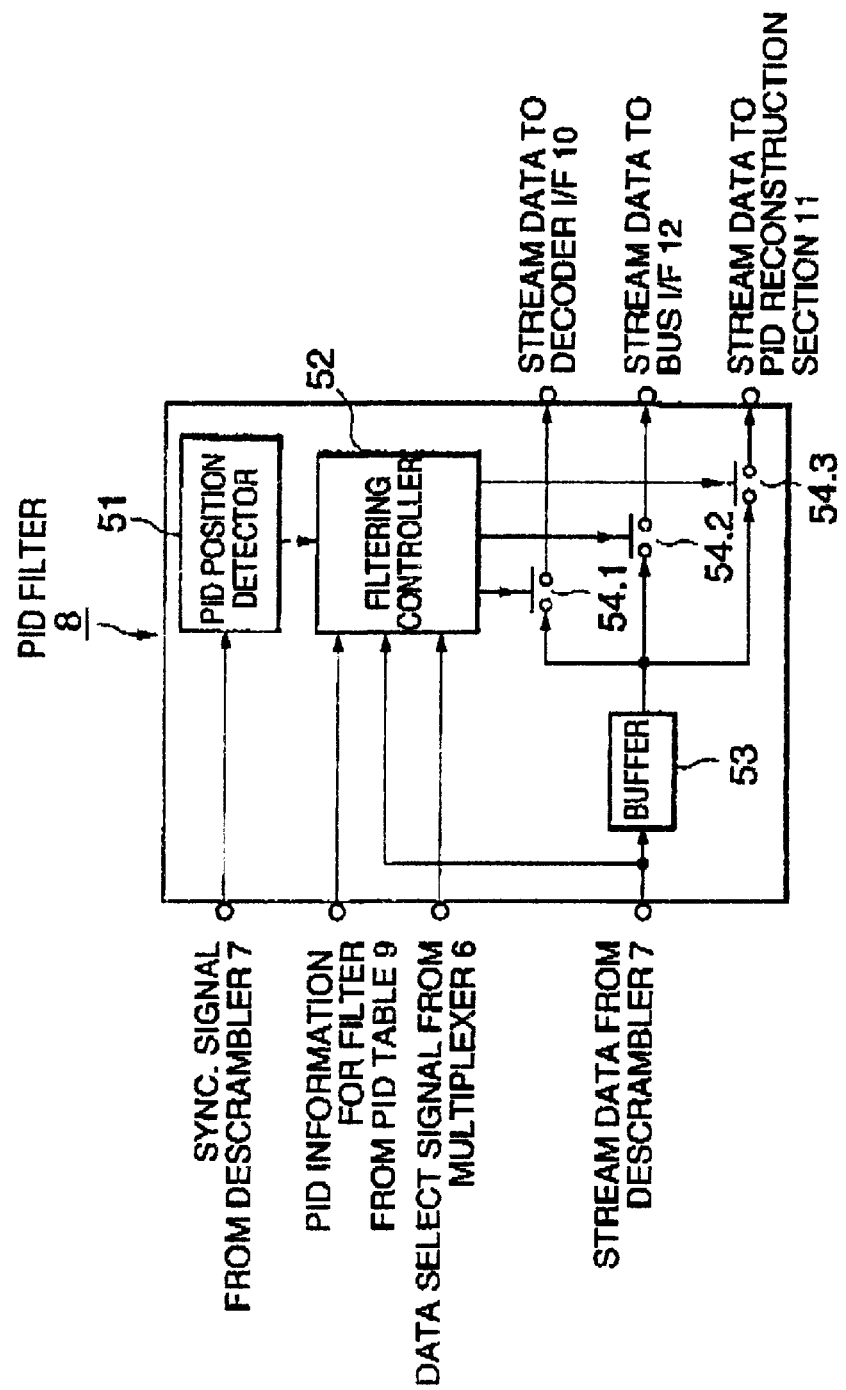
FIG. 7 is a diagram showing an example of the configuration of a PID filter in the embodiment of the present invention.

FIG. 7 shows a detailed configuration of the PID filter 8 in the embodiment of the present invention.

With reference to FIG. 7, the PID filter 8 is provided with a PID position detector 51, a filtering controller 52, a buffer 53, and switches 54.1, 54.2, and 54.3.

On the basis of a synchronization signal received from the descrambler 7, the PID position detector 51 detects the position of a PID in a packet included in the input stream data, and outputs a PID position signal indicating a detection result to the filtering controller 52.

If the PID position signal has a value indicating the position of a PID in a packet included in the stream data, then the filtering controller 52 compares the PID in the packet included in the stream data supplied from the descrambler 7, with a value of the filter PID table stored in the PID table 9. Depending on the match state and the state of the data select signal inputted from the multiplexer 6, the filtering controller 52 controls the switches 54.1 through 54.3.

More specifically, if the PID of a packet included in a stream data supplied from the descrambler 7 matches the PID of a packet containing a program to be decoded, which is stored in the PID table 9, then the packet data is output to the decoder I/F 10. If the PID of a packet included in a stream data supplied from the descrambler 7 matches the PID of a packet to be extracted from the stream data, which is stored in the PID table 9, and the data select signal indicates that the stream has been supplied from the demodulator 1, then the packet data Is output to the bus I/F 12. If the data select signal indicates that the stream has been supplied from the demodulator 2, then the packet data is output to the bus I/F 12.

Operation

In the case where video data and audio data are handled in digital satellite broadcasting and cable TV, a plurality of programs and additional information are multiplexed according to time division multiplexing scheme into one carrier (channel) and are transmitted by using, for example, a transport stream system (TS system) stipulated in MPEG. When forming a TS packet in the TS system, a packet identification (PID) is added to the header of a TS packet in order to identify the contents included in each TS packet.

In the embodiment of the present invention, it is assumed that the PID provided for each program and each additional information is unique only In one channel and here two channels of a TS system are received.

Figure 8:
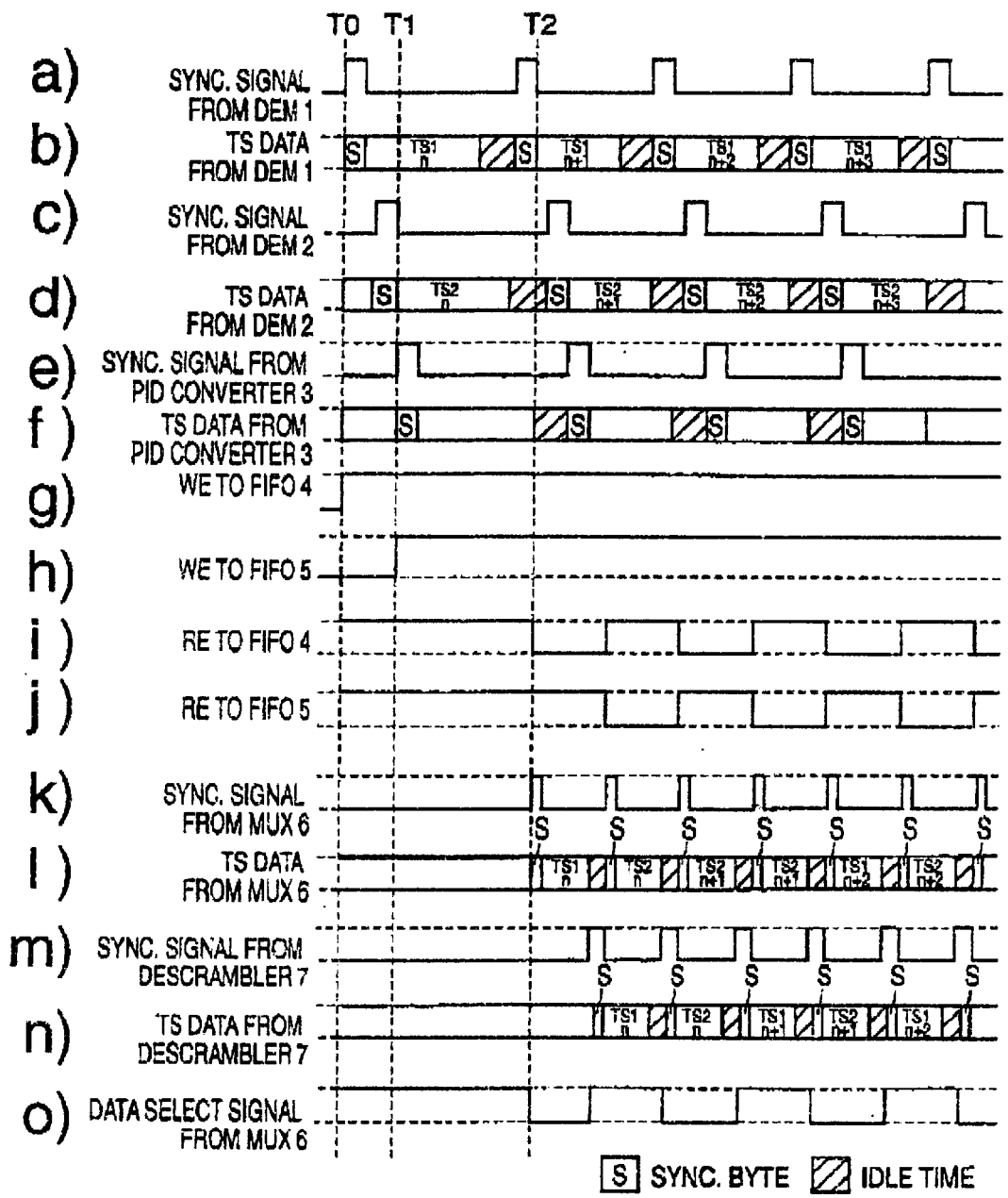
FIG. 8 is a timing diagram showing an operation of the embodiment of the present invention.
Figure 9A:
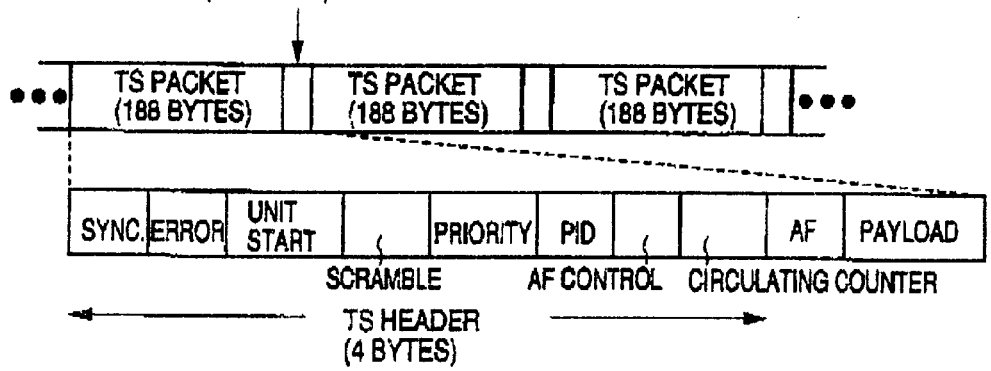
FIGS. 9A–9C are a diagram showing the packet format of a TS packet.
Figure 9B:
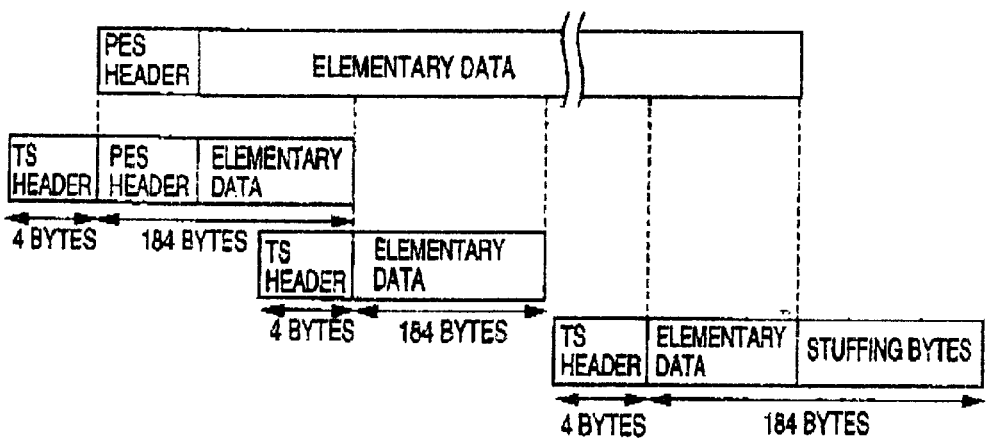
Figure 9C:
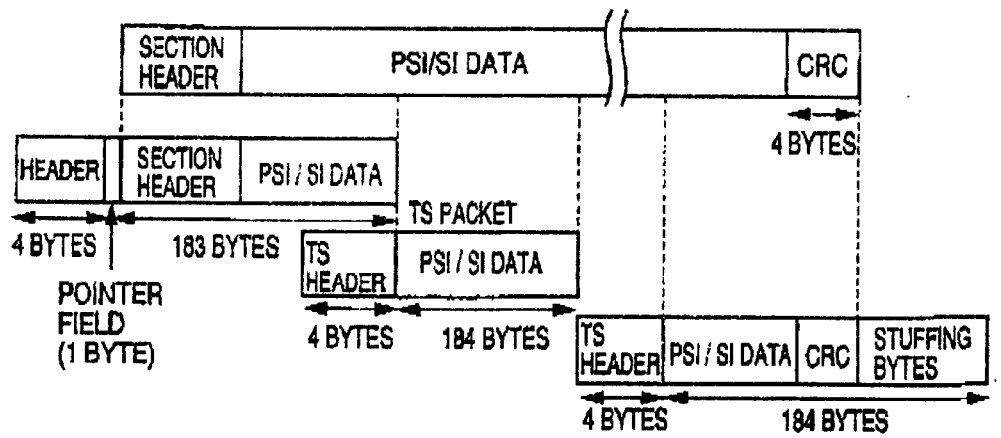

Referring to FIG. 8, a synchronization signal indicating a first head of a TS packet is output from the first demodulator 1 at time T0. Upon receiving this synchronization signal, the multiplexer 6 generates a first FIFO write enable signal for starting writing TS data into the first FIFO buffer 4.

Subsequently, at time T1, a synchronization signal indicating a first head of a TS packet is output from the PID converter 3. Upon receiving this synchronization signal, the multiplexer 6 generates a second FIFO write enable signal for starting writing TS data into the second FIFO buffer 5. At this time, the multiplexer 6 has not yet read out data from the first FIFO buffer 4 and the second FIFO buffer 5. Further, a PID concerning PID conversion has not been set in the PID table 9. The TS packet supplied from the second demodulator 2 is output from the PID converter 3 as it Is.

At time T2, the multiplexer 6 receives the second synchronization signal from the demodulator 1 in such a state that the first FIFO write enable signal is active. Thereupon, the multiplexer 6 generates the first FIFO read enable signal and outputs it to the second FIFO buffer 5 in order to start readout of TS data from the first FIFO buffer 4.

If the PID converter 3 outputs a second synchronization signal earlier than the second synchronization signal from the demodulator 1, then the multiplexer 6 generates the second FIFO read enable signal instead of the first FIFO read enable signal, outputs the second FIFO read enable signal to the second FIFO buffer 5, and starts data readout from the second FIFO buffer 5.

Simultaneously with starting data readout from the second FIFO buffer 5, the multiplexer 6 begins to count the number of data units read out, and resets the count every time the count reaches a count value corresponding to one TS packet (for example, 188 bytes of a TS packet plus 16 bytes of empty data in which code data out of error correction were housed). Simultaneously with the count resetting, the multiplexer 6 alternately outputs the first and second FIFO read enable signals, and switches between TS data readout from the first FIFO buffer 4 and TS data readout from the second FIF0 buffer 5.

Further, on the basis of the count value of data read out, the multiplexer 6 generates a synchronization signal indicating the head of the read TS data. Together with TS data read out from the first FIFO buffer 4 and the second FIFO buffer 5, the multiplexer 6 outputs the synchronization signal to the descrambler 7.

The multiplexer 6 reads out data from the first FIFO buffer 4 and the second FIFO buffer 5 at a rate equivalent to twice the rate of writing. Thereby, TS packets of two channels can be multiplexed.

On the basis of the system control program stored in the ROM 14, the CPU 13 first stores a fixed PID value stipulated in the TS system storing each program Information in the PID table 9 via the bus I/F 12, in order to obtain program information contained in each channel of digital satellite broadcasting, cable TV, or the like.

On the basis of filter PID information stored in the PID table 9, the PID filter 8 selects a matched TS packet among TS packets multiplexed by the multiplexer 6 and supplied from the descrambler 7 and transfers it to the bus I/F 12 to temporarily stores It into the RAM 15.

The CPU 13 analyzes TS packets stored In the RAM 15, acquires peculiar PID values assigned to each program and each additional information, and sets the PID value of a desired program or additional information in the PID table 9.

If there are a plurality of desired programs or additional information pieces, which are assigned to channels of different frequencies and there are PIDs of the same value, then the CPU 13 converts the PID of a desired TS packet in the TS system supplied from the second demodulator 2 to an arbitrary value by using the PID converter 3.

More specifically, the conversion of PID is performed as follows. The CPU 13 determine whether there is a PID value in the TS system supplied from the second demodulator 2, which is identical to a PID value of a TS packet in the TS system supplied from the first demodulator 1. If such an overlapped PID value is found in the TS system supplied from the second demodulator 2, then the CPU 13 searches for a PID value which Is not overlapped and stores the overlapped PID value into the conversion PID table A, and the searched PID value which is not overlapped into the conversion PID table B (see FIG. 4).

The PID converter 3 converts the PID of a TS packet included in the TS system supplied from the demodulator 2 based on the PID values set in the conversion PID tables A and B of the PID table 9. Therefore, the TS data multiplexed by the multiplexer 6 have no TS packet having overlapped PID in a plurality of desired programs or additional information pieces.

In the case where an encrypted program or additional information piece has been acquired, the CPU 13 sets the PID of a TS packet containing encryption information of the encrypted program or additional Information piece in the filter PID table in the PID table 9. In the case of encryption information for TS data supplied from the first demodulator 1, the CPU 13 stores the encryption information in the data buffer 16. In the case of encryption information for TS data supplied from the second demodulator 2, the CPU 13 stores the encryption information in the data buffer 17. The CPU 13 analyzes the encryption information, and sets the encryption information in the descrambler 7 as the scramble release key together with the PID of a TS packet to be subjected to decryption.

At this time, if the desired program or additional information is a TS packet supplied from the second demodulator 2 and a PID-converted TS packet is to be subjected to decryption, then a PID after PID conversion is set in the descrambler 7.

Even if programs or additional information pieces stored in TS packets having overlapped PIDs between channels are received when receiving TS data of a plurality of channels, it is possible in the configuration heretofore described to handle data independently, without confusion of data caused by overlapped PIDs.

Further, even if programs or additional information pieces written in TS packets having overlapped PIDs between channels are received when receiving TS data of a plurality of channels and respective programs or additional information pieces have been encrypted, it is possible to obtain data individually decrypted.

As heretofore described, the present invention brings about the following advantages.

A first advantage of the present invention Is that packet data are obtained at the same time in respective channels even in the case where packets having IDs of the same value exist in stream data of different channels.

A second advantage of the present invention is that duplicated configuration of decryption means, data packet extraction means, and Identification storage means operating on the basis of PIDs of data packets can be eliminated, because PID conversion means and PID reconstruction means are provided so as to prevent packet data of different channels having the same IDs from existing in stream data.

What is claimed is:

1. A digital broadcast receiver for inputting stream data of a plurality of channels from a plurality of demodulators, comprising:

a converter for converting packet identification information of stream data inputted from a first demodulator;

a multiplexer for multiplexing stream data of which the packet identification information is converted by the converter and stream data inputted from a second demodulator to a single stream of data;

a stream divider for dividing the single stream of data into first packets having packet identification information converted by the converter, and second packets inputted from the second demodulator;

a reverse converter for converting the converted packet identification information of the first packets to original packet identification information; and a transfer means for transferring packets outputted by the reverse converter and the second packets outputted by the stream divider to separately store them in a memory.

2. A digital broadcast receiver for receiving modulated signals on a plurality of channels, comprising:

first and second demodulators which demodulate first and second modulated signals respectively to produce first and second stream data each including a plurality of packets on different ones of the channels, wherein each of the packets is one of an element signal packet and a control signal packet;

a conversion table for storing conversion information for stored packet identification information;

a converter for converting packet identification information of a packet in the first stream data to temporary identification information to produce third stream data when the packet identification information of the packet matches the stored packet identification information stored in the conversion table;

a multiplexer for multiplexing the third stream data and the second stream data to fourth stream data;

a packet distributor for distributing each of control signal packets included in the fourth stream data depending on which of the third and second stream data the packet is included in;

a reverse converter for converting the temporary identification information of a control signal packet distributed by the packet distributor and included in the third stream data to original packet identification information; and a memory for separately storing control signal packets included in the second stream data and control signal packets which has been converted by the reverse converter.

3. The digital broadcast receiver according to claim 2, wherein the conversion table comprises:

a first table containing the stored packet identification information identifying a plurality of packets on a plurality of channels; and a second table containing the temporary identification information with which the stored packet identification information is replaced, the temporary identification information uniquely identifying a single packet.

4. The digital broadcast receiver according to claim 3, wherein the converter comprises:

a match detector for detecting the packet identification information of the packet matching the stored packet identification information from the first stream data on the predetermined channel; and an identification converter for replacing the packet identification information of the packet with the temporary identification information.

5. The digital broadcast receiver according to claim 3, wherein the multiplexer multiplexes the third stream data and the second stream data to the fourth stream data and produces a data select signal indicating which of the third and second stream data is selected in the fourth stream data, wherein the packet distributor distributes each of control signal packets included in the fourth stream data depending on the data select signal received from the multiplexer.

6. The digital broadcast receiver according to claim 2, wherein the conversion table comprises:

a filter table containing filter packet identification information identifying an element signal packet;

a first table containing the stored packet identification information identifying a plurality of packets on a plurality of channels; and a second table containing the temporary identification information with which the stored packet identification information is replaced, the temporary identification information uniquely identifying a single packet.

7. The digital broadcast receiver according to claim 6, wherein the multiplexer multiplexes the third stream data and the second stream data to the fourth stream data and produces a data select signal indicating which of the third and second stream data is selected in the fourth stream data.

8. The digital broadcast receiver according to claim 7, wherein the packet distributor distributes each of packets included in the fourth stream data to a decoder depending on whether the packet is the element signal packet, by referring to the filter table of the conversion table, and then distributes each of remaining packets in the fourth stream data to a first output and a second output, depending on the data select signal received from the multiplexer.

9. A digital broadcast receiver for receiving modulated signals on a plurality of channels, comprising:

first and second demodulators which demodulate first and second modulated signals respectively to produce first and second stream data each including a plurality of packets on different ones of the channels, wherein each of the packets is one of an element signal packet and a control signal packet;

a conversion table for storing conversion information for stored packet identification information;

a converter for converting packet identification information of a packet in the first stream data to temporary identification information to produce third stream data when the packet identification information of the packet matches the stored packet identification information stored in the conversion table;

a multiplexer for multiplexing the third stream data and the second stream data to fourth stream data;

a descrambler for descrambling the fourth stream data according to a preset descrambling key;

a packet distributor for distributing each of control signal packets included in the descrambled fourth stream data depending on which of the third and second stream data the packet is included in;

a reverse converter for converting the temporary identification information of a control signal packet distributed by the packet distributor and included in the third stream data to original packet identification information; and a memory for separately storing control signal packets included in the second stream data and control signal packets which has been converted by the reverse converter.

10. The digital broadcast receiver according to claim 9, wherein the conversion table comprises:

a filter table containing filter packet identification information identifying an element signal packet and scramble-packet identification information identifying a control signal packet including scramble data which is used to produce a descrambling key;

a first table containing the stored packet identification information identifying a plurality of packets on a plurality of channels; and a second table containing the temporary identification information with which the stored packet identification information is replaced, the temporary identification information uniquely identifying a single packet.

11. The digital broadcast receiver according to claim 10, wherein the descrambler descrambles packets of the fourth stream data identified by the descramble-packet identification information stored in the filter table of the conversion table.

12. A method for inputting stream data of a plurality of channels from a plurality of demodulators in a digital broadcast receiver, comprising the steps of:

converting packet identification information of stream data inputted from first demodulator;

multiplexing stream data of which the packet identification information is converted and stream data inputted from a second demodulator to a single stream of data;

dividing the single stream of data into first packets having packet identification information converted, and second packets inputted from the second demodulator;

converting the converted packet identification information of the first packets back to original packet identification information; and transferring packets having the original packet identification information and the second packets to separately storing store them in a memory.

13. A method for receiving modulated signals on a plurality of channels in a digital broadcast receiver, comprising the steps of:

a) demodulating a first and second modulated signals respectively to produce first and second stream data each including a plurality of packets on different ones of the channels, wherein each of the packets is one of an element signal packet and a control signal packet;

b) storing conversion information for stored packet identification information in a conversion table;

c) converting packet identification information of a packet in the first stream data to temporary identification information to produce third stream data when the packet identification information of the packet matches the stored packet identification information stored in the conversion table;

d) multiplexing the third stream data and the second stream data to fourth stream data;

e) distributing each of control signal packets included in the fourth stream data depending on which of the third and second stream data the packet is included in;

f) converting the temporary identification information of a control signal packet distributed in the step e) and included in the third stream data to original packet identification information; and g) separately storing control signal packets included in the second stream data and control signal packets which has been converted in the step f).

14. The method according to claim 13, wherein the conversion table includes:

a first table containing the stored packet identification information identifying a plurality of packets on a plurality of channels; and a second table containing the temporary identification information with which the stored packet identification information is replaced, the temporary identification information uniquely identifying a single packet.

15. The method according to claim 13, wherein the conversion table includes:

a filter table containing filter packet identification information identifying an element signal packet;

a first table containing the stored packet identification information identifying a plurality of packets on a plurality of channels; and a second table containing the temporary identification information with which the stored packet identification information is replaced, the temporary identification information uniquely identifying a single packet.

16. The method according to claim 15, wherein the step (d) comprises the steps of:

multiplexing the third stream data and the second stream data to the fourth stream data; and producing a data select signal indicating which of the third and second stream data is selected in the fourth stream data.

17. The method according to claim 16, wherein the step (e) comprises the steps of:

distributing each of packets included in the fourth stream data to a decoder depending on whether the packet is the element signal packet, by referring to the filter table of the conversion table; and distributing each of remaining packets in the fourth stream data, depending on the data select signal.

18. A method for receiving modulated signals on a plurality of channels in a digital broadcast receiver, comprising the steps of:

a) demodulating first and second modulated signals respectively to produce first and second stream data each including a plurality of packets on different ones of the channels, wherein each of the packets is one of an element signal packet and a control signal packet;

b) storing conversion information for stored packet identification information in a conversion table;

c) converting packet identification information of a packet in the first stream data to temporary identification information to produce third stream data when the packet identification information of the packet matches the stored packet identification information stored in the conversion table;

d) multiplexing the third stream data and the second stream data to fourth stream data;

e) decrypting the fourth stream data according to a preset decryption key;

f) distributing each of control signal packets included in the decrypted fourth stream data depending on which of the third and second stream data the packet is included in;

g) converting the temporary identification information of a control signal packet distributed and included in the second stream data to original packet identification information; and h) separately storing control signal packets included in the second stream data and control signal packets which has been converted.

19. The method according to claim 18, wherein the conversion table comprises:

a filter table containing filter packet identification information identifying an element signal packet and encryption-packet identification information identifying a control signal packet including encryption data which is used to produce a decryption key;

a first table containing the stored packet identification information identifying a plurality of packets on a plurality of channels; and a second table containing the temporary identification information with which the stored packet identification information is replaced, the temporary identification information uniquely identifying a single packet.

20. The method according to claim 19, wherein in the step (e), packets of the fourth stream data identified by the decryption-packet identification information are decrypted.

* * * * *